US010112246B2

(12) United States Patent
Landi et al.

(10) Patent No.: US 10,112,246 B2
(45) Date of Patent: Oct. 30, 2018

(54) METHOD FOR FINISHING HARDENED GEARS

(71) Applicant: SAMP S.P.A. CON UNICO SOCIO, Bentivoglio (IT)

(72) Inventors: Enrico Landi, Bentivoglio (IT); Klaus Peiffer, Bentivoglio (IT)

(73) Assignee: SAMP S.P.A. CON UNICO SOCIO, Bentivoglio (IT)

( * ) Notice: Subject to any disclaimer, the term of this patent is extended or adjusted under 35 U.S.C. 154(b) by 112 days.

(21) Appl. No.: 15/319,780

(22) PCT Filed: Jun. 18, 2015

(86) PCT No.: PCT/IB2015/054604
§ 371 (c)(1),
(2) Date: Mar. 27, 2017

(87) PCT Pub. No.: WO2015/193839
PCT Pub. Date: Dec. 23, 2015

(65) Prior Publication Data
US 2017/0120358 A1    May 4, 2017

(30) Foreign Application Priority Data
Jun. 18, 2014  (IT) .............................. BO2014A0339

(51) Int. Cl.
*B23F 17/00*    (2006.01)
*B23F 5/22*    (2006.01)
*B23F 5/04*    (2006.01)

(52) U.S. Cl.
CPC .............. *B23F 17/006* (2013.01); *B23F 5/04* (2013.01); *B23F 5/22* (2013.01); *B23F 17/003* (2013.01); *Y02P 70/175* (2015.11)

(58) Field of Classification Search
CPC ........ B23F 17/003; B23F 17/006; B23F 5/04; B23F 5/22; Y02P 70/175
See application file for complete search history.

(56) References Cited

U.S. PATENT DOCUMENTS

| 4,947,590 A * | 8/1990 | Schapp ................. B23F 19/007 409/32 |
| 6,116,828 A * | 9/2000 | Egawa ..................... B23F 5/20 407/119 |
| 2011/0229282 A1* | 9/2011 | Ohno .................... B23F 17/006 409/8 |

(Continued)

FOREIGN PATENT DOCUMENTS

| CN | 201140345 | 12/2007 |
| CN | 201140345 Y * | 10/2008 |

(Continued)

OTHER PUBLICATIONS

XP001542480, Den schnelleren Gang einlegen, Mar. 2006.
XP001101258, Vranic, Michael, Oct. 2001.

*Primary Examiner* — Marc Carlson
(74) *Attorney, Agent, or Firm* — Matthew A. Pequignot; Pequignot + Myers

(57) ABSTRACT

Method for finishing hardened gears comprising: a first dry removal step of a first stock amount by means of a first cutting tool with defined cutting edges; and a second dry removal step of a second stock amount by means of a second cutting tool with non defined cutting edges.

14 Claims, 5 Drawing Sheets

(56) References Cited

U.S. PATENT DOCUMENTS

2015/0113778 A1\* 4/2015 Schreiber ................ B23P 13/00
                                                    29/6.01
2016/0250701 A1\* 9/2016 Geiser ....................... B23F 5/08
                                                    451/47

FOREIGN PATENT DOCUMENTS

| DE | 10211129      |   | 10/2003 |                  |
|----|---------------|---|---------|------------------|
| EP | 0870565       |   | 10/1998 |                  |
| EP | 2570229       |   | 3/2013  |                  |
| JP | 62-44310      |   | 2/1987  |                  |
| JP | 2000158234 A  | \* | 6/2000  | ................ B23F 5/22 |
| JP | 2000233320 A  | \* | 8/2000  | ............ B23F 17/003 |
| WO | WO2011010210  |   | 1/2011  |                  |

\* cited by examiner

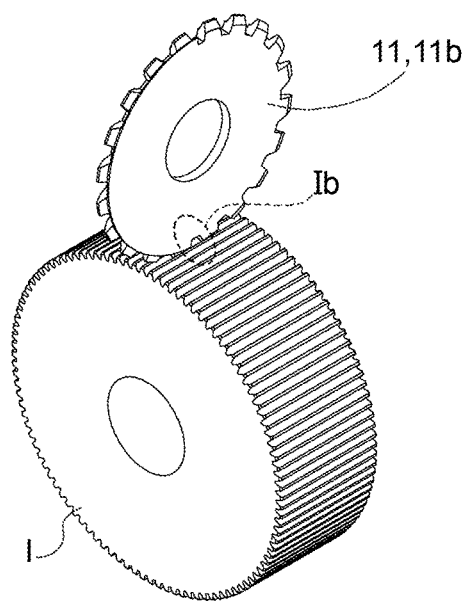
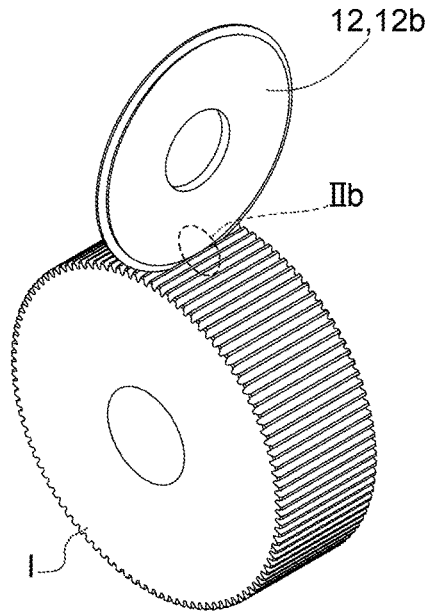
FIG.7  FIG.8
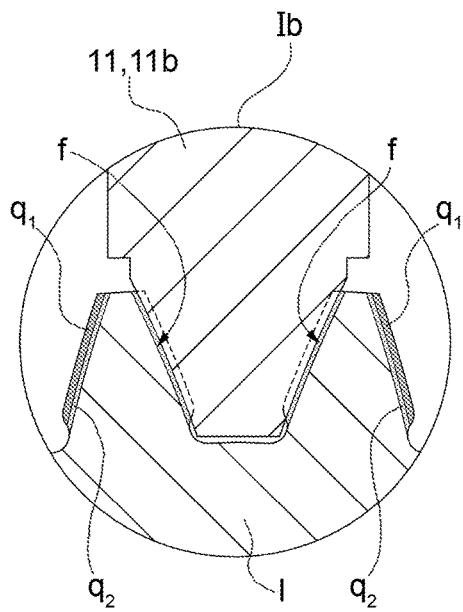
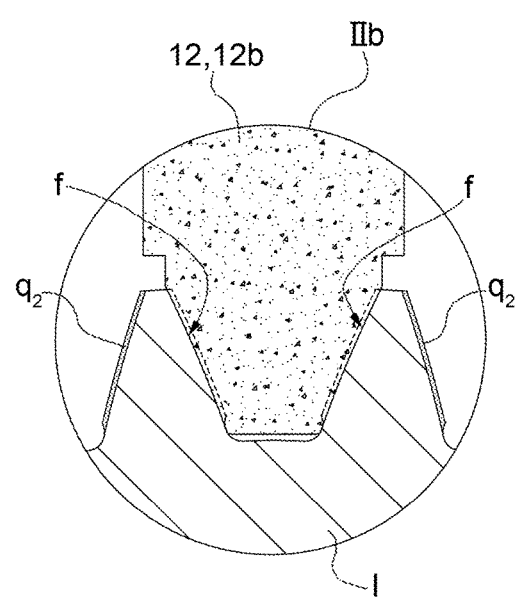
FIG.9  FIG.10

METHOD FOR FINISHING HARDENED GEARS

RELATED APPLICATION DATA

This application is the national stage entry of International Appl. No. PCT/IB2015/054604, filed Jun. 18, 2015, which claims priority to Italian Patent Application No. BO2014A000339, filed Jun. 18, 2014. All claims of priority to such applications are hereby made, and such applications are hereby incorporated in their entirety by reference.

TECHNICAL FIELD

The present invention concerns a method for finishing hardened gears, preferably for dry finishing gears having a module range of 1.00-3.50 [mm].

This kind of gears is particularly used for automotive transmissions requiring high performances in terms of transmitted power, low noise emission and efficiency. This result is achieved by means of hardened, ground gears (with a surface hardness of at least 54 [HRC]). In fact, this kind of gears presently provides the best quality/price ratio.

The gear performance is mainly determined by the geometry and the surface structure of the gear flanks. Although the tooth root area as well as the transition area between the tooth root and the flanks (root fillet area) is of some importance, still today most transmission gears are not finished in these areas after the hardening process but are finished only on their flanks.

BACKGROUND ART

It is well known the fact of producing the aforesaid gears by means of the following operations: cutting teeth into a cylindrical workpiece made of soft metal ("green") (performed by means of one or more subsequent processes, in particular hobbing or shaping and shaving) and hardening.

With a reference to the aforesaid operations, the hardening process inevitably leads to changes in the gear profile, lead and pitch in particular: it alters the tooth macro-geometry. Therefore, given that the geometrical and the surface quality of the gear teeth depend on the sequence of processes they undergo, hardened gears intended for a high-performance use are inevitably subjected to subsequent finishing operations, in particular grinding operations, in order to obtain the best possible surface quality and accuracy. For a complete levelling of all imperfections of the gear geometry from the machining of soft metal "green machining" and due to distortion during hardening a minimum total stock removal normal to the flank of the gear of $q \geq 0.03 \times m$ [mm] is needed, wherein m is the module of the gear.

The grinding processes of the aforesaid hardened gears, besides producing chips, generate high amounts of heat. Only a minimum of this heat can be taken off by the chips and by the tool, and therefore lubricating oils or emulsions are used, aiming: to cool the component in order to avoid that the too hot gear gets damaged during the grinding process. In particular, if the gear gets too hot ("burns"), the hardening is ruined and the gear surface is no longer suitable for the required use.

However, the use of lubricating oil implies several disadvantages:

- complex and large systems to supply oil to and to return oil from the machine, filter chips from the oil and cool the oil to a certain temperature;
- management costs for keeping the area surrounding the machines clean;
- additional equipment to clean remaining oil from the ground gears;
- maintenance costs for replacing the lubricating oil;
- disposal costs of used lubricating oil, mixed with metal shavings;
- protection and health care costs for the operators from contacting and inhaling lubricating oil.

In order to avoid the use of lubricating oil, dry hobbing processes of hardened gears are known. However, the surface quality obtained by these processes is not sufficient for automotive transmission applications. Moreover, also dry grinding processes with extremely long production times are known (for example such processes are disclosed in "Innovative Zahnradfertigung", ed. Expert Verlag, 1986, ISBN-13: 978-3-8169-1871-4) but these processes are not suitable for the production of automotive transmission gears with very short machining times (few seconds).

DISCLOSURE OF INVENTION

The aim of the present invention is the realization in competitive times (in a few seconds) of hardened gears having a high surface finish by means of dry finishing processes (namely without lubricating oil). In particular, the aim of the present invention is to provide a method for grinding hardened gears without using lubricating oil and in competitive times.

The aim of the present invention is to provide a method for machining hardened gears according to Claim 1 and to the following Claims.

BRIEF DESCRIPTION OF THE DRAWINGS

The present invention will be now described with a reference to the alleged drawings, showing examples of nonlimiting embodiments, wherein:

FIGS. 7 and 8 are schematics views of a hardened gear during a first and, respectively, second machining steps by means of disk-shaped tools; and FIGS. 9 and 10 are enlarged sketches of areas Ib and IIb of FIG. 7 and, respectively, FIG. 8.

BEST MODE FOR CARRYING OUT THE INVENTION

Figure 1:
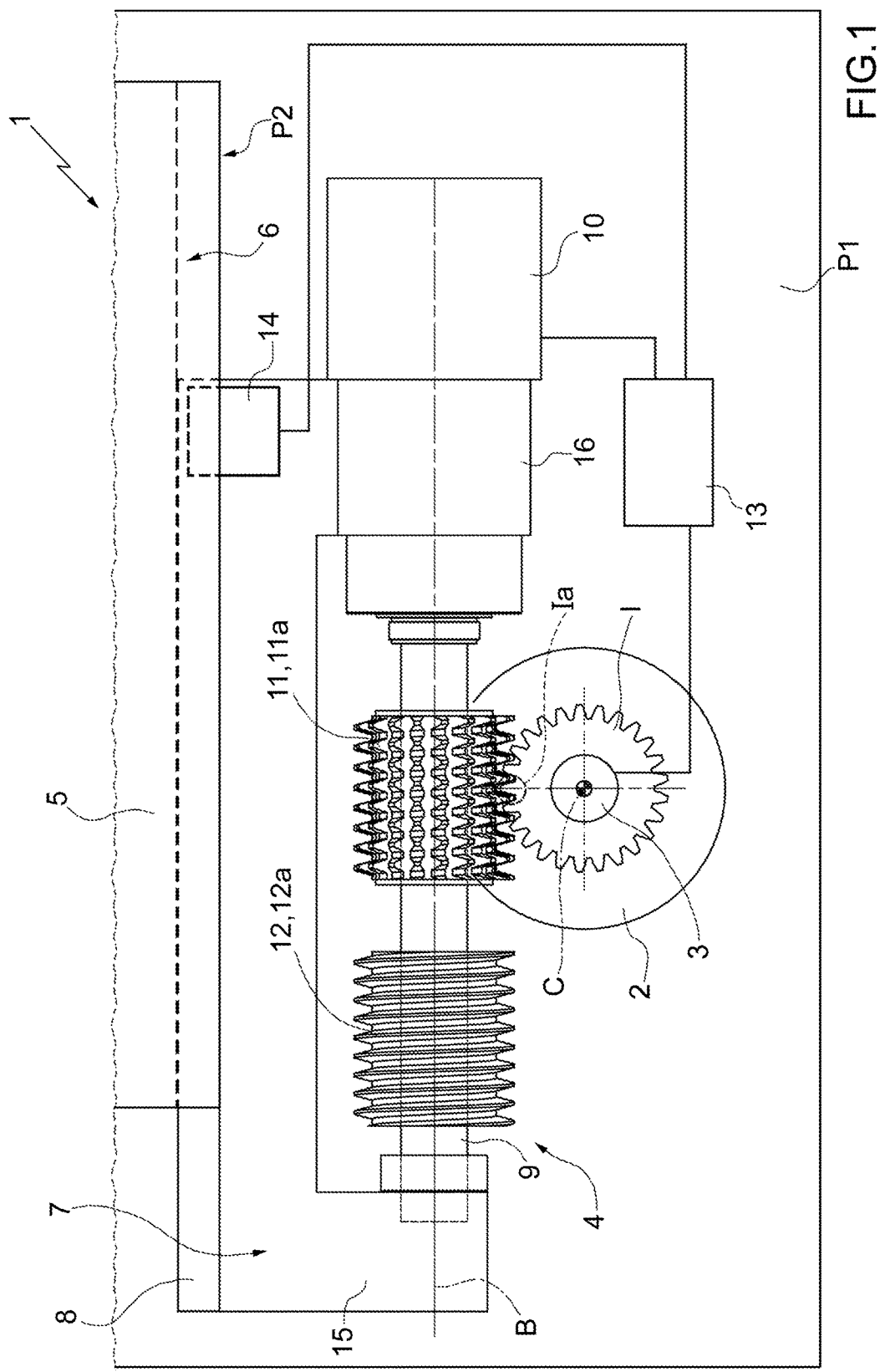
FIG. 1 is a plan view of a hardened gear during a first machining step.
Figure 2:
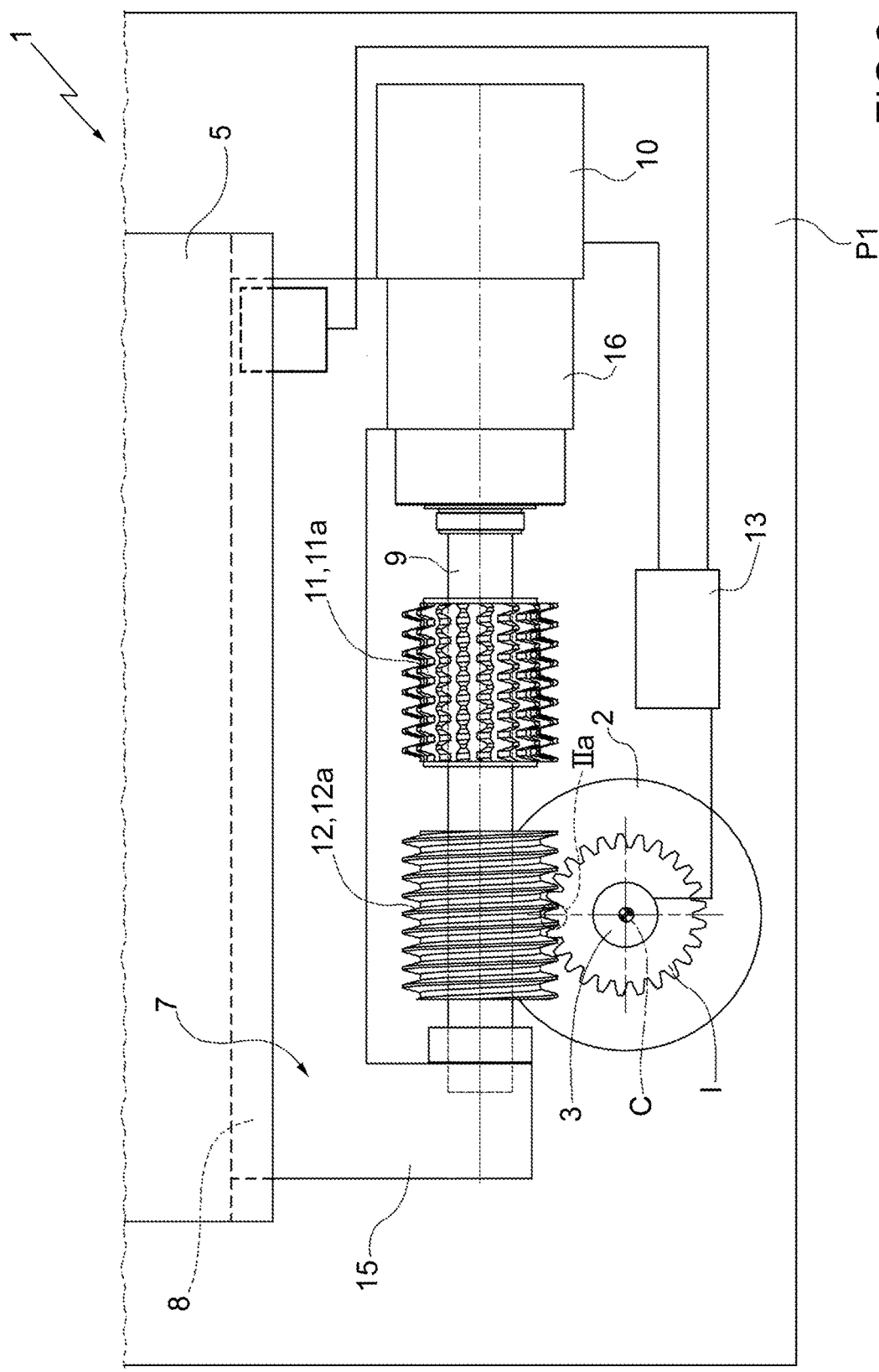
FIG. 2 is similar to FIG. 1 and shows the hardened gear in a second machining step.

In FIGS. 1 and 2, 1 indicates as a whole a machine tool for finishing gears, which comprises a workpiece supporting table 2, resting in a known and schematically illustrated way on a supporting plane P1, a workpiece supporting spindle 3, having a rotational axis C mounted (in a known and schematically illustrated way) on the workpiece supporting table 2, and a cutting unit 4. The axis C is substantially perpendicular to the plane P1.

The cutting unit 4 comprises a base 5 having a guide 6, a slide 7, which in turn comprises a guideway 8 slidably mounted (in a known and schematically illustrated way) inside the guide 6, and an operating device 14 (of a known and schematically illustrated type) which can read the position of slide 7 along the guide 6. As illustrated, the slide 7 is slidably mounted on a plane P2 parallel to the axis C of the workpiece supporting spindle 3, and substantially perpendicular to the supporting plane P1. The slide 7 comprises two supporting elements 15, 16 which are substantially perpendicular to the plane P2.

The cutting unit 4 comprises a shaft 9, which has a rotational axis B and is mounted with its ends on the supporting elements 15, 16 (in a known and schematically illustrated way). The shaft 9 is rotatable about the axis B.

The cutting unit 4 comprises a motor 10 (of a known and schematically illustrated type) which can rotate the shaft 9 about the axis B. Preferably, the axis B is parallel to the plane P2.

The cutting unit 4 comprises a cutting tool 11 with defined cutting edges and a cutting tool 12 with non defined cutting edges which are both fitted on the shaft 9 and are mutually spaced along the axis B.

Cutting tool 11 with defined cutting edges is of a known type and comprises a plurality of cutting elements having preset profiles with known cutting angle, upper clearance angle and lower rake angles. This kind of tool is particularly suitable for removing large and unevenly distributed stock and the chips taken are capable of removing most of the process heat. Therefore these tools are well suited for dry cutting operations.

Cutting tool 12 with non defined cutting edges is of a known type and comprises a plurality of cutting elements which have undefined shapes and distribution (generally having a negative rake angle). This kind of tools carry out abrasive processes for the surface finishing of the machined product. Taking chips with cutting tool 12 with non defined cutting edges is based on plastic deformation and friction between cutting tool 12 and gear I to be machined and therefore generates high amounts of heat depending on the stock amount removed.

Both cutting tools, i.e. cutting tool 11 with defined cutting edges and cutting tool 12 with non defined cutting edges, can be cylindrical worms or can be of disk-type shape.

Furthermore, the machine 1 comprises a control unit 13 which is coupled (in a known and schematically illustrated way) with: the workpiece supporting spindle 3, the operating device 14 of the slide 7, and the motor 10. The control unit 13 adjusts the translation of the slide 7 on the plane P2, the rotation of the shaft 9 and the rotation of the workpiece supporting spindle 3 in order to synchronize and engage, in use, a gear I fitted on the workpiece supporting spindle 3 with the cutting tool 11 with defined cutting edges and, subsequently, with the cutting tool 12 with non defined edges (as better explained hereinafter).

In FIGS. 1 and 2, 11a indicates a cutting tool with defined cutting edges and, respectively, 12a indicates a cutting tool with non defined cutting edges which are cylindrical worm tools. For example, cutting tool 11a is a hob and cutting tool 12a is a threaded grinding wheel.

Figures 5, 6:
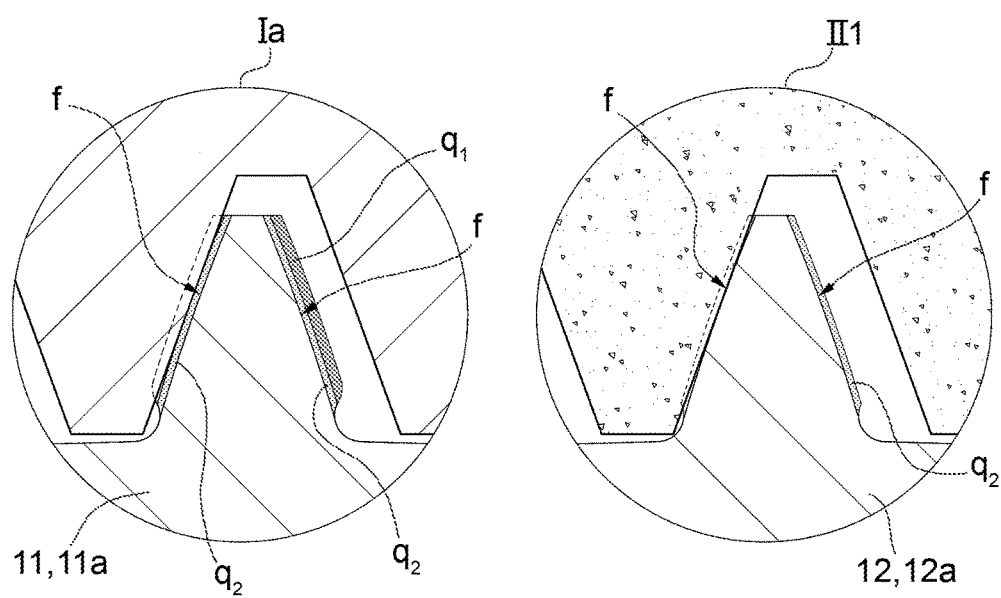
FIGS. 5 and 6 are enlarged sketches of areas Ia and IIa of FIG. 1 and, respectively, FIG. 2.

As shown in FIGS. 5 and 6, the cylindrical worm tools 11a and 12a have straight profiles. Therefore, the gear involute is generated by an additional cinematic which is a continuous rotary rolling motion of the gear I to be machined synchronized to the rotation of each cutting tool 11a and 12a. Due to the absence of the non-productive indexing in respect of the machining with cutting tools 11b and 12b of disk-type shape (as will be seen more in detail below), cutting tools 11a and 12a increase, advantageously, the productivity and therefore justify the additional complexity of the rolling motion in mass production. In particular, cylindrical worm tools 11a and 12a are advantageously for the mass production of small gears with module range m comprised between 1.00 and 3.50 [mm].

In FIG. 7, 11b indicates a cutting tool of disk-type shape and with defined cutting edges. In FIG. 8, 12b indicates a cutting tool of disk-type shape and with non defined cutting edges.

For example, cutting tool 11b is a milling cutter and cutting tool 12b is a grinding disk.

As can be seen in FIGS. 9 and 10, cutting tools 11b and 12b of disk-type shape have the exact profile of the tooth space of the gear I to be machined and operate on a tooth-by-tooth basis.

Figure 3:
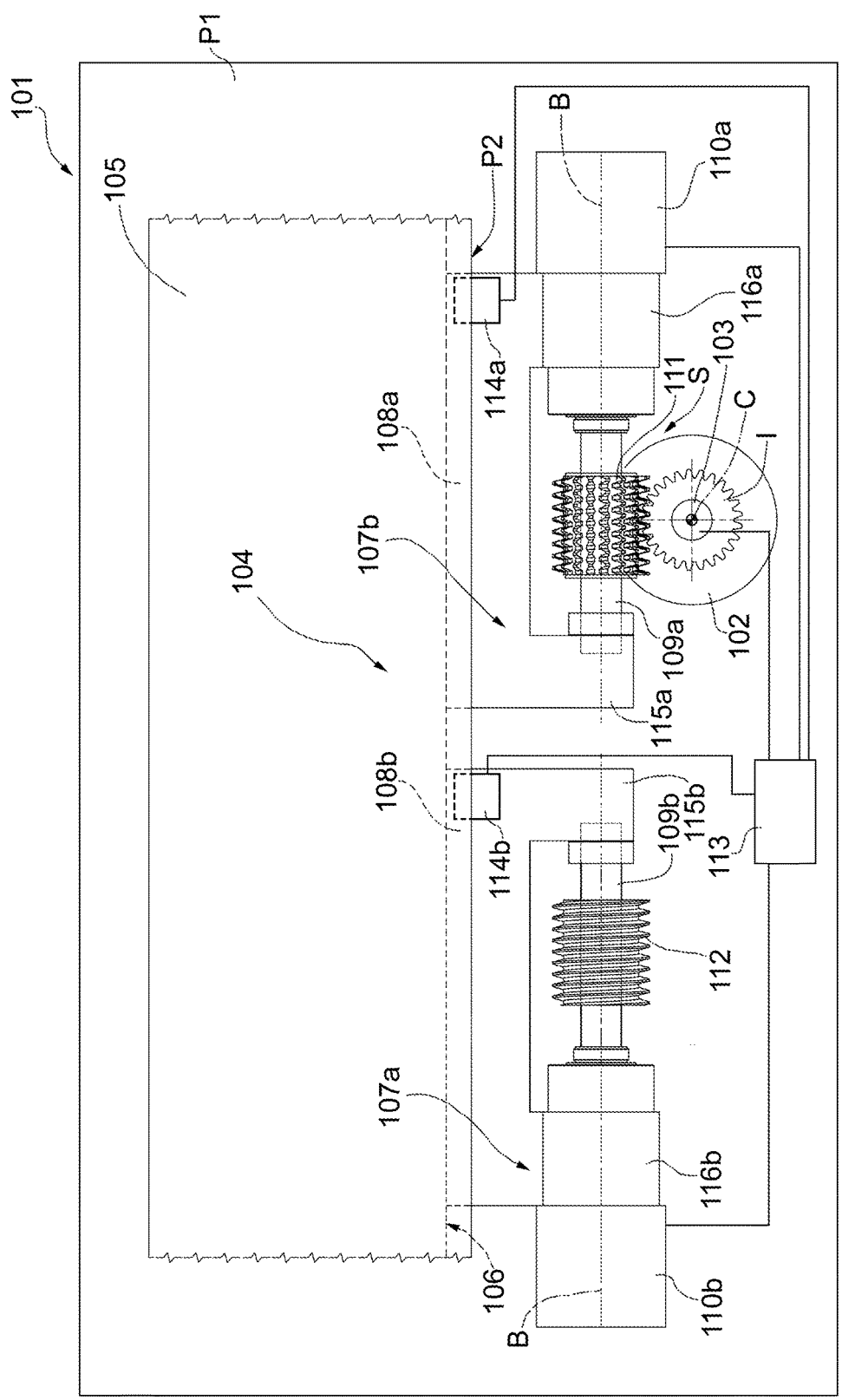
FIG. 3 is similar to FIG. 1 and shows an alternative embodiment according to the present method.

Because of the absence of the additional cinematic (i.e. the continuous rotary rolling motion of the gear I to be machined synchronized to the rotation of each tool 11a and 12a) the disk-type tools 11b and 12b require a more simple cinematic but need additional non-productive time to index the cutting tools 11b and 12b from tooth to tooth. Therefore disk-type cutting tools 11b and 12b are advantageously dedicated to large machines and the production of large gears. FIG. 3 shows an alternative embodiment 101 of the machine illustrated in FIG. 1 in a first working configuration. Components equal to those of the machine 1 maintain the same numbering in the hundreds.

According to the embodiment illustrated in FIG. 3, the cutting unit 104 comprises two slides 107a and 107b, which are slidably mounted (in a known and schematically illustrated way) on the base 105. Each slide 107a (107b) comprises, in turn, a guideway 108a (108b) which is slidably mounted inside a guide 106 of the base 105, and an operating device 114a (114b) which can read the position of the slide 107a (107b) along the guide 106. The slides 107a and 107b are driven, independently from each other, along the guide 106.

The cutting unit 104 comprises a shaft 109a, which has a rotational axis B and is mounted with its ends (in a known and schematically illustrated way) on the supporting elements 115a and 116a. The shaft 109a is rotatable about the axis B. The cutting unit 104 comprises a motor 110a (of a known and schematically illustrated type) which can rotate the shaft 109a about the axis B. Preferably, the axis B is parallel to the plane P2. The cutting unit 104 comprises a cutting tool 111 with defined cutting edges which is fitted around the shaft 109a.

The cutting unit 104 comprises a shaft 109b, which has a rotational axis B and is mounted with its ends (in a known and schematically illustrated way) on the supporting elements 115b and 116b. The shaft 109b is rotatable about the axis B. The cutting unit 104 comprises a motor 110b (of a known and schematically illustrated type) which can rotate the shaft 109b about the axis B. Preferably, the axis B is parallel to the plane P2. The cutting unit 104 comprises a cutting tool 112 with non defined cutting edges which is fitted around the shaft 109b.

In use, a hardened gear I is fitted on the workpiece supporting spindle 3 (103). Preferably, the gear I has a surface hardness higher than 54 [HRC] and a module m comprised between 1.00 and 3.50 [mm].

Figure 4:
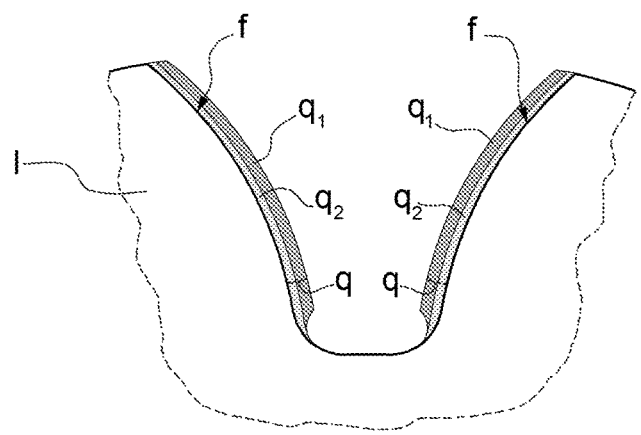
FIG. 4 is a sketch of a gear tooth of an hardened gear before machining.

Moreover, the gear I has a total stock q (as illustrated in FIG. 4) to be removed, normal to the gear flank f. The total stock q is more than or equal to $0.03 \times m$ [mm] ($q \geq 0.03 \times m$ [mm]) for a complete levelling of all imperfections of the gear geometry from the machining of soft metal "green machining" and due to distortion during hardening.

The method comprises a starting dry removal step (without lubricating oil) of an initial stock $q_1$ (as illustrated in FIG. 5 or 9) of gear I by means of a cutting tool 11 (111) with defined cutting edges, and a subsequent dry removal step (without lubricating oil) of a remaining stock $q_2$ (as illustrated in FIG. 6 or 10) of gear I by means of a cutting tool 12 (112) with non defined cutting edges.

The starting removal step substantially corrects the geometric imperfections of the gear flank f (macro-geometry) and removes almost all the total stock q. During the starting removal step, the gear I engages the cutting tool 11 (111) with defined cutting edges. The use of a cutting tool 11 (111) with defined cutting edges allows the removal of a remarkable amount of unevenly distributed stock. The use of a cutting tool 11 (111) with defined cutting edges is advantageous for the starting removal step, because the distribution of the total stock q is not known at the beginning. Furthermore, the cutting tool 11 (111) with defined cutting edges allows the easy removal of possible hardened burrs protruding from the edges of the hardened gear I.

The subsequent removal step corrects the microgeometric surface imperfections. During the subsequent removal, the gear I engages the cutting tool 12 (112) with non defined cutting edges. The risk of thermal damage in processes by means of cutting tools 12 (112) with non defined cutting edges (grinding) is very much depending on the amount of remaining stock $q_2$.

For an economic production, the total amount of material removed (Volume $V_w$) and the time used for this removal (cutting time $t_c$) are important.

The capability of cutting and grinding processes are typically described by the specific volume $V_w$ and the specific removal rate $Q_w$.

The specific volume $V_{wi}$ [mm³/mm] of the removed material is defined by the relationship:

$$V_{wi} = \frac{(q_i \times z \times b)}{\cos(\beta)}$$

wherein,
i is an index which is 1 for the starting removal step and 2 for the subsequent removal step (FIG. 4);
$q_i$ is the stock to be removed [mm];
z is the number of gear teeth;
b is the face width of the gear flank f [mm];
β is the helix angle of the gear [deg].
Parameters z, b and β are defined by the geometry of the gear I to be worked.

The cutting time $t_{ci}$ [s] to remove specific volume $V_{wi}$ is defined by the relationship:

$$t_{ci} = \frac{(b + \Delta_{zi})}{f_{zi}}$$

wherein,
$\Delta_{zi}$ is the process related to extra travel, which is function of the tool geometry, in particular tool diameter and numbers of starts [mm]; and
$f_{zi}$ is the feed rate which is function of the technology and the tool geometry, in particular tool diameter and numbers of starts [mm/min].

Owing to the above, $t_{c1}$ and $t_{c2}$ can be adjusted by the process data, in particular the cutting speed, the feed rate, the tool diameter and the number of starts (for cylindrical worm tools).

Specific volume $V_{wi}$ and cutting time $t_{ci}$ can be combined to a specific removal rate $Q_{wi} \pm [\text{mm}^3/(\text{mm} \times \text{s})]$ which defines the productivity of the process steps according to the relationship:

$$Q_{wi} = \frac{V_{wi}}{t_{ci}}$$

in other words:

$$Q_{wi} = \frac{q_i \times z \times b}{\cos\beta \times t_{ci}}$$

The overall productivity defined by the specific removal rate $Q_w$, of the starting dry removal step and the subsequent dry removal step is as follows:

$$Q_W = Q_{w1} + Q_{w2} = \frac{V_{w1}}{t_{c1}} + \frac{V_{w2}}{t_{c2}}$$

in other words:

$$Q_{wi} = \frac{q_1 \times z \times b}{\cos\beta \times t_{c1}} + \frac{q_2 \times z \times b}{\cos\beta \times t_{c2}} = \frac{z \times b}{\cos\beta} \times \left( \frac{q_1 \times f_{z1}}{b + \Delta_{z1}} + \frac{q_1 \times f_{z2}}{b + \Delta_{z2}} \right)$$

To be competitive with current gear hard finishing using lubricating oil a specific removal rate of at least $Q_w \geq 2.5$ [mm³/(mm×s)] must be achieved.

Owing to the above, the combined specific removal rate $Q_w$ (the productivity) can only be achieved by an optimized combination of $q_1/t_{c1}$ for the starting dry removal step and $q_2/t_{c2}$ for the subsequent dry removal step.

Especially, during the subsequent dry removal step with non defined cutting edges (for example grinding) the risk of thermal damage of the ground surface is very much depending on the amount of the remaining stock $q_2$. Therefore it is advantageous, to keep the remaining stock $q_2$ as small as possible.

Advantageously after the starting removal step, the remaining stock $q_2$ is less than or equal to 0.01×m [mm] (namely $q_2 \leq 0.01 \times m$ [mm]) and the initial stock $q_1$ of the initial removal step is more than 0.02×m [mm] (namely $q_1 > 0.02 \times m$ [mm]).

For example, to obtain the above mentioned advantages, the cutting tool 11 is a cylindrical worm tool 11a (111) and the process data of the cutting tool 11a (111) with defined cutting edge during the starting dry removal step comprise a cutting speed $v_{c1}$ more than or equal to 70 [m/min]; in particular, the cutting speed $v_{c1}$ is less or equal to 250 [m/min] (namely $70 \leq v_{c1} \leq 250$ [m/min]). Advantageously, the cutting tool 11a (111) with defined cutting edge comprises a tool diameter $d_{01}$ which is more than or equal to 50 [mm] and less or equal to 100 [mm] (namely $50 \leq d_{01} \leq 100$ [mm]). Advantageously, the cutting tool 11a (111) with defined cutting edge comprises a number of starts more than or equal to 1 and less or equal to 5 (namely $1 \leq n_{s1} \leq 5$).

For example, to obtain the above mentioned advantages, the cutting tool 12 is a cylindrical worm 12a (112) and the process data of the cutting tool 12a (112) with non defined cutting edge during the subsequent dry removal step comprise a cutting speed $v_{c2}$ more than or equal to 30 [m/s]; in particular, the cutting speed $v_{c2}$ is less or equal to 100 [m/s] (namely 30≤$v_{c2}$≤100 [m/s]). Advantageously, the cutting tool 12a (112) with non defined cutting edge comprises a tool diameter $d_{02}$ which is more than or equal to 100 [mm] and less or equal to 320 [mm] (namely 100≤$d_{02}$×320 [mm]). Advantageously, the cutting tool 12a (112) with non defined cutting edge comprises a number of starts more than or equal to 1 and less or equal to 7 (namely 1≤$n_{s2}$≤7).

According to the aforesaid method, the starting stock $q_1$ removed by means of a cutting tool 11 (111) with defined cutting edges is in percentage the larger portion of the total stock q to be removed. Cutting by means of a cutting tool 11 (111) with defined cutting edges allows the correction of geometric imperfections and the quick removal of most of the stock q.

Therefore, the subsequent removal step by means of the cutting tool 12 (112) with non defined cutting edges takes place on a gear I having an extremely small remaining stock $q_2$. As a result the heat in the dry process of the cutting tool 12 (112) with non defined cutting edges is low enough so that the hardening is not ruined and the gear surface remains suitable for the required use.

Then, the cutting time of the cutting tool 12 (112) with non defined cutting edges is longer than the cutting time of the cutting tool 11 (111) with defined cutting edges, but is sufficient to complete the whole machining process of the gear I in a competitive time (a few seconds).

Since the remaining stock $q_2$ is very small ($q_2$≤0.01×m [mm]), control sensors presently used in machine tools to determine the rotational position of the gear I in order to mesh it perfectly with the tool (112) are not able to detect such an amount of remaining stock $q_2$ accurately enough to adjust the process accordingly. Therefore, the steps of the aforesaid process cannot be carried out on two separate machines, since the margin of error of known control systems is larger than the remaining stock $q_2$ to be removed, thus making impossible the correct adjustment/meshing of the cutting tool 12 (112) with non defined cutting edges.

Preparing on a same machine 1 (101) a cutting tool 11 (111) with defined cutting edges for the starting removal step and a cutting tool 12 (112) with non defined cutting edges for the subsequent removal step allows to overcome the problem related to the accuracy of control sensors for adjusting the grinding process, since the starting removal step (hobbing for removing $q_1$) and the subsequent removal step (grinding for removing $q_2$) are adjusted according to the total stock q and to the process parameters detected by the control unit 13 (113).

Moreover, planning both machining steps on a same machine 1 (101) allows to reduce the machine preparation times related to the loading/unloading of gear I on the workpiece supporting spindle 3 (103).

Since the steps of the aforesaid method are dry (without lubricating oil), the machine 1 (101) is completely free from all economic and environmental drawbacks deriving from the use of lubricating oil.

The invention claimed is:

1. Method for finishing hardened gears having a stock amount $$q > 0.03 \times m$$

wherein
q=total stock to be removed normal to a gear flank [mm];
m=gear module [mm];
said method comprising:
performing a first dry removal step of a first stock amount ($q_1$) from a hardened gear using a first cutting tool with defined cutting edges; and
performing a second dry removal step of a second stock amount ($q_2$) from said hardened gear using a second cutting tool with non-defined cutting edges.

2. Method according to claim 1, wherein the first dry removal step and the second dry removal step are carried out on the same machine.

3. Method according to claim 1, wherein the first stock amount ($q_1$), the process data for the first cutting tool during the first dry removal step, the second stock amount ($q_2$) and the process data for the second cutting tool during the second dry removal step are adjusted in order to obtain a combined specific removal rate ($Q_w$) of at least 2.5 [mm³/(mm×s)].

4. Method according to claim 1, wherein the hardened gear has a surface hardness of at least 54 [HRC].

5. Method according to claim 1, wherein the value of the module m is 1.00≤m≤3.50 [mm].

6. Method according to claim 1, wherein after the first dry removal step, the second stock amount ($q_2$) is less or equal to 0.01×m [mm]; wherein m is the value of the module of the gear and the first stock amount ($q_1$) is more or equal to 0.02×m [mm].

7. Method according to claim 1, wherein the first dry removal step and the second dry removal step are carried out in direct succession on a same gear.

8. Method according to claim 1, wherein the gear to be finished is clamped on a same workpiece supporting spindle during the first and the second dry removal step; and wherein the gear is fixed in a single work station during the first and the second dry removal step.

9. Method according to claim 1, wherein the first cutting tool and the second cutting tool are mounted on a same shaft.

10. Method according to claim 1, wherein the first cutting tool is mounted on a first shaft and the second cutting tool is mounted on a second shaft; wherein the first cutting tool and the second cutting tool are independently operated.

11. Method according to claim 1, wherein the first cutting tool and the second cutting tool are disk-type tools wherein the first cutting tool with defined cutting edges is a milling cutter and the second cutting tool with non-defined cutting edges is a grinding disk.

12. Method according to claim 1, wherein the first cutting tool and the second cutting tool are cylindrical worm tools wherein the first cutting tool with defined cutting edges is a hob and the second cutting tool with non-defined cutting edges is a threaded grinding wheel.

13. Method according to claim 1, wherein the process data of the first cutting tool with defined cutting edge comprise a cutting speed which is more than or equal to 70 [m/min].

14. Method according to claim 1, wherein the process data of the second cutting tool with non-defined cutting edge during the second dry removal step comprise a cutting speed which is more than or equal to 30 [m/s].

* * * * *